(12) United States Patent
Grider et al.

(10) Patent No.: US 10,093,303 B2
(45) Date of Patent: Oct. 9, 2018

(54) METHOD AND SYSTEM FOR DETERMINING A PLUG-IN HYBRID ELECTRIC VEHICLE EXPECTED DRIVE RANGE

(75) Inventors: Duane M. Grider, Farmington Hills, MI (US); Bruce Carvell Blakemore, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1441 days.

(21) Appl. No.: 12/858,112

(22) Filed: Aug. 17, 2010

(65) Prior Publication Data

US 2011/0046834 A1 Feb. 24, 2011

Related U.S. Application Data

(60) Provisional application No. 61/234,958, filed on Aug. 18, 2009, provisional application No. 61/329,915, filed on Apr. 30, 2010.

(51) Int. Cl.
| | |
|---|---|
| *B60W 20/00* | (2016.01) |
| *B60W 10/06* | (2006.01) |
| *B60W 10/08* | (2006.01) |
| *B60W 50/14* | (2012.01) |
| *B60W 20/11* | (2016.01) |

(52) U.S. Cl.
CPC ............ *B60W 20/11* (2016.01); *B60W 10/06* (2013.01); *B60W 10/08* (2013.01); *B60W 20/00* (2013.01); *B60W 2050/146* (2013.01); *B60W 2510/244* (2013.01); *B60W 2560/02* (2013.01); *Y02T 10/6269* (2013.01); *Y02T 10/6286* (2013.01); *Y02T 90/14* (2013.01)

(58) Field of Classification Search
CPC ...... B60W 20/00; B60W 10/06; B60W 10/08; Y02T 10/6269
USPC ............................ 701/22; 180/65.1; 903/930
See application file for complete search history.

(56) References Cited

U.S. PATENT DOCUMENTS

| | | | | |
|---|---|---|---|---|
| 6,116,363 | A * | 9/2000 | Frank ......................... | 180/65.25 |
| 6,166,449 | A * | 12/2000 | Takaoka et al. ............ | 290/40 B |
| 6,201,312 | B1 | 3/2001 | Shioiri et al. | |
| 6,793,027 | B1 * | 9/2004 | Yamada et al. .............. | 180/65.1 |

(Continued)

FOREIGN PATENT DOCUMENTS

| | | |
|---|---|---|
| JP | 2007239511 A | 9/2007 |
| JP | 2008279829 A | 11/2008 |
| KR | 20020034552 A | 5/2002 |
| KR | 20030095030 A | 12/2003 |

OTHER PUBLICATIONS

John M. Miller, Propulsion Systems for Hybrid Vehicles, Jan. 4 2004, ISBN-13: 978-0863419157, p. 50.*

(Continued)

*Primary Examiner* — Krishnan Ramesh
(74) *Attorney, Agent, or Firm* — David B. Kelley; Brooks Kushman P.C.

(57) ABSTRACT

A vehicle may include an engine and electric machine each configured to generate motive power for the vehicle, a battery configured to store energy for the electric machine, and a tank configured to store fuel for the engine. The vehicle may further include one or more controllers configured to determine a vehicle drive range based on an amount of fuel in the tank and an available charge depletion energy in the battery.

9 Claims, 1 Drawing Sheet

(56) References Cited

U.S. PATENT DOCUMENTS

| | | | |
|---|---|---|---|
| 2006/0219448 A1* | 10/2006 | Grieve et al. | 180/65.3 |
| 2007/0029121 A1* | 2/2007 | Saitou et al. | 180/65.2 |
| 2009/0040033 A1* | 2/2009 | Uchida | 340/439 |
| 2009/0044996 A1* | 2/2009 | Frank | 180/65.29 |
| 2009/0150015 A1* | 6/2009 | Okubo et al. | 701/22 |
| 2009/0150016 A1* | 6/2009 | Hung et al. | 701/22 |
| 2009/0157244 A1 | 6/2009 | Kim | |
| 2009/0174538 A1* | 7/2009 | Shibata et al. | 340/438 |
| 2009/0192660 A1* | 7/2009 | Tamor et al. | 701/22 |
| 2009/0277701 A1* | 11/2009 | Soma et al. | 180/65.25 |
| 2010/0121590 A1* | 5/2010 | Kato | 702/63 |
| 2010/0164439 A1* | 7/2010 | Ido | 320/155 |
| 2012/0109413 A1* | 5/2012 | Smith et al. | 701/1 |
| 2013/0073113 A1* | 3/2013 | Wang et al. | 701/1 |

OTHER PUBLICATIONS

Recommended Practice for Measuring the Exhaust Emissions and Fuel Economy of Hybrid-Electric Vehicles, Including Plug-in Hybrid Vehicles, J1711_199903, Mar. 1 1999.*

Nobuo Iwai, Analysis on Fuel Economy and Advanced Systems of Hybrid Vehicles, Engine and Environment Research Division, Japan Automobile Research Institute, Mar. 30, 1998, 9 pgs., Ibaraki 305-0822, Japan.

Electric and Hybrid Vehicle Research, Development, and Demonstration Program; Petroleum-Equivalent Fuel Economy Calculation, Federal Register Environmental Documents, United States Environmental Protection Agency, Department of Energy, Office of Energy Efficiency and Renewable Energy, Jun. 12, 2000, vol. 65, No. 113, pp. 36985-36992.

J. Gonder and A. Simpson, Measuring and Reporting Fuel Economy of Plug-In Hybrid Electric Vehicles, National Renewable Energy Laboratory, Conference Paper presented at 22nd International Battery, Hybrid and Fuel Cell Electric Vehicle Symposium and Exhibition, Oct. 23-28, 2006, 15 pgs., Yokohama, Japan.

Michigan Information Transfer Source, Fuel Economy and Emission Performance of Fuel Cell Based Diesel HEVs, Journal of Fuel Cell Science and Technology, vol. 5, No. 1, Feb. 2008, 5 pgs.

* cited by examiner

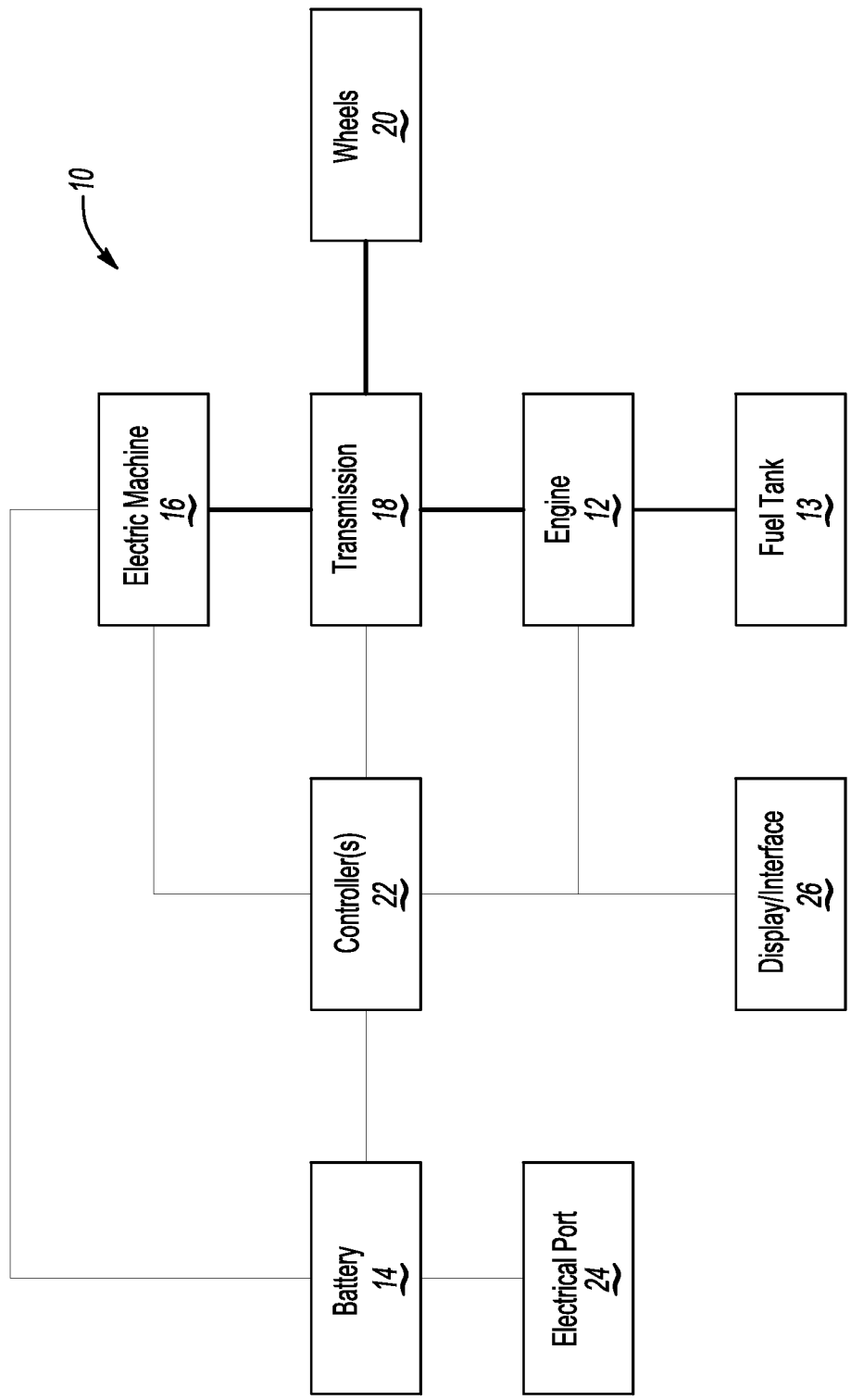

METHOD AND SYSTEM FOR DETERMINING A PLUG-IN HYBRID ELECTRIC VEHICLE EXPECTED DRIVE RANGE

CROSS-REFERENCE TO RELATED APPLICATIONS

This application claims the benefit of U.S. provisional application Ser. No. 61/234,958, filed Aug. 18, 2009 and U.S. provisional application Ser. No. 61/329,915, filed Apr. 30, 2010, each of which are hereby incorporated by reference in their entirety.

STATEMENT REGARDING FEDERALLY FUNDED RESEARCH

The invention was made with Government support under DE-FC26-08NT04384 awarded by the Department of Energy. The Government has certain rights in the invention.

BACKGROUND

Plug-in hybrid electric vehicles (PHEVs) may be caused to move by operation of an electric machine and/or an internal combustion engine. The electric machine may receive electrical power from an on-board battery. The battery may be charged with electrical power from a utility grid.

PHEV drivers may wish to know their overall fuel economy and/or distance to empty/expected vehicle drive range.

SUMMARY

A plug-in hybrid electric vehicle may include a battery, fuel tank and one or more controllers. The one or more controllers may be configured to determine an expected drive range of the vehicle based on an amount of fuel in the fuel tank and an available charge depletion energy in the battery.

A method for advising a driver of a vehicle may include determining a gasoline consumption rate for a drive cycle of the vehicle and determining an equivalent gasoline consumption rate for the drive cycle based on a current or voltage associated with the vehicle's battery. The method may also include determining a distance to empty based on the determined rates, an amount of fuel in the fuel tank, and an available charge depletion energy in the battery, and presenting the determined distance to empty to the driver.

BRIEF DESCRIPTION OF THE DRAWINGS

FIG. 1 is a block diagram of an example plug-in hybrid electric vehicle.

DETAILED DESCRIPTION

A battery/electric machine and engine of a plug-in hybrid electric vehicle (PHEV) may be operated/controlled in at least two different modes: charge depleting mode and charge sustaining mode. (This is in contrast to a hybrid electric vehicle (HEV) which lacks a charge depleting mode.) In charge depleting mode, power used to move the vehicle is primarily generated by the electric machine and occasionally supplemented by the engine. In charge sustaining mode, power used to move the vehicle is primarily generated by the engine and occasionally supplemented by the electric machine. Energy taken from the battery while in charge sustaining mode (to power the electric machine) may be replenished by operation of the engine. Energy taken from the battery while in charge depleting mode (to power the electric machine) is not replenished by operation of the engine.

The battery/electric machine and engine of a PHEV, as an example, may be operated in charge depleting mode if the state of charge of the battery is greater than 60%. That is, power used to move the vehicle will be primarily generated by the electric machine (and supplemented by the engine) as long as the state of charge of the battery is greater than 60%. The battery/electric machine and engine may be operated in charge sustaining mode if the state of charge of the battery is less than or equal to 60% (and greater than 40%). That is, power used to move the vehicle will be primarily generated by the engine (and supplemented by the electric machine) as long as the state of charge of the battery is less than or equal to 60% and greater than 40%. In this example, the battery is no longer used to power the electric machine to move the vehicle once its state of charge becomes less than or equal to 40%. Of course, other ranges of states of charge (or other parameters) may effectively define the charge depleting and charge sustaining modes.

Providing a fuel economy estimate in a PHEV may require combining the fuel economies of each fuel used into a single fuel economy measure. For example, a PHEV that uses gasoline (gallons) and electricity (kWhrs) may require a calculation to combine gasoline usage and electricity usage into an overall fuel economy expressed in a common unit (e.g., either in miles per gallon or kilowatt hours per mile).

Established methods of calculating fuel economy result in a miles per gallon value that may give vehicle drivers an indication on how efficiently they are using gasoline. PHEV drivers, however, may wish to know the efficiency associated with their electricity use. Furthermore, PHEV drivers may wish to know the efficiency associated with their combined use of gasoline and electricity.

Certain PHEV fuel economy determinations may calculate a total energy used (reported either in kWhrs or gallons). These techniques, however, may not accurately determine the actual gasoline savings obtained during a drive cycle because the fuels are treated as if they have the same energy densities and/or system efficiencies. Gasoline, however, has an energy density of 33.04 kWhrs/gal. The density of energy stored in a battery is much less. Only a small percentage of the energy stored in gasoline is delivered to the wheels as compared with the energy stored in a battery. Additionally, these techniques may not inform the driver as to whether they minimized their use of gasoline. Instantaneous and average fuel economy may also be difficult to determine. Finally, these techniques may not be able to accurately estimate the total distance the driver could drive before refuelling.

Certain embodiments disclosed herein may provide, for a PHEV, a combined fuel economy estimate for two or more on-board fuels and/or a distance to empty (expected drive range) determination. These estimates and/or determinations may account for differences in energy density and/or system efficiency between the fuels.

Fuel usage, in some embodiments, may be measured via onboard sensing. Gasoline consumption, for example, may be determined based on measured fuel injector pulses in any suitable/known fashion. Electrical power consumption may be determined based on a measured battery current and voltage in any suitable/known fashion. Other techniques, however, may be used.

These measured values may then be converted to the same units using a conversion that accounts for their differences in efficiency. For example, electrical energy may be converted to gasoline gallon equivalents using a petroleum equivalent factor (PEF) which accounts for the anticipated equivalent gasoline usage. Known algorithms based on engine mapping, in other scenarios, may be used to determine the efficiency of gasoline usage. Hence, the PEF would reflect a more efficient use of energy as the driver improves their drive style. This more efficient use of gasoline may be reflected in the anticipated fuel cost savings as well as the estimated range associated with the remaining fuel in the vehicle. The total energy content for each of the on-board fuels may then be combined, for example, to estimate the average fuel economy and/or the instantaneous fuel economy for the vehicle.

Referring to FIG. 1, an embodiment of a PHEV 10 may include an engine 12 (and associated fuel tank 13), battery 14 and electric machine 16. The PHEV 10 may also include a transmission 18, wheels 20, one or more controllers 22, electrical port 24, and display/interface 26 (e.g., screen, speakers, etc.) The engine 12, electric machine 16 and wheels 20 are mechanically connected with the transmission 18 (as indicated by thick line) in any suitable/known fashion such that the engine 12 and/or electric machine 16 may drive the wheels 20, the engine 12 and/or wheels 20 may drive the electric machine 16, and the electric machine 16 may drive the engine 12. Other arrangements are also possible.

The battery 14 may provide energy to or receive energy from the electric machine 16. The battery 14 may also receive energy from a utility grid (not shown) via the electrical port 24.

The one or more controllers 22 are in communication with and/or control the engine 12, battery 14, electric machine 16, transmission 18 and display/interface 26 (as indicated by thin line). The one or more controllers 22, for example, may operate the engine 12 and electric machine 16 in a charge depleting mode while a state of charge of the battery 14 is greater than, for example, 65%. Hence, 65% in this example is the charge depleting lower threshold. The one or more controllers 22 may operate the engine 12 and electric machine 16 in a charge sustaining mode while a state of charge of the battery 14 is greater than, for example, 45% and less than or equal to 65%. In this example, the electric machine 16 (as powered by the battery 14) will be the primary source of motive power for the vehicle 10 if the battery's state of charge is greater than 65%. The engine 12 will be the primary source of motive power for the vehicle 10 if the battery's state of charge is greater than 45% and less than or equal to 65%.

The one or more controllers 22 may also, for example, determine a blended (i.e., gasoline and electricity) fuel economy via the following relations/algorithms:

BLMPG (Blended Operation Miles Per Gallon During Drive Cycle)=[Distance Traveled During Drive Cycle/(GC+EQGC)]{in units of miles per gallon} where

GC (Gasoline Consumed During Drive Cycle)= [Number of Fuel Injector Pulses*Injector Pulse Volume]{in units of gallons} and

EQGC (Equivalent Gallons Consumed During Drive Cycle)=[(Measured (Current*Voltage) integrated over drive time of drive cycle)*PEF]{in units of gallons}.

In this example,

PEF (Petroleum Equivalence Factor)=equivalent gallons required to deliver desired energy=[ECE/GCE]

where

ECE (Electrical Conversion Efficiency)=electrical energy to mechanical power conversion efficiency (e.g., 0.85)

and

GCE (Gasoline Conversion Efficiency)=gasoline to mechanical power conversion efficiency=(e.g., 0.25).

The one or more controllers 22 may obtain/determine information regarding the distance traveled for a particular drive cycle/trip, number of fuel injector pulses, and injector pulse volume in any suitable/known fashion (for example, based on information from the vehicle's controller area network (CAN) (not shown), etc.) Likewise, the one or more controllers 22 may obtain measured current and voltage information associated with the battery 14 in any suitable/known fashion (for example, based on information from the vehicle's CAN, etc.) The efficiency parameters discussed above (and elsewhere herein) may be determined via testing, simulation, etc., stored in memory and accessed by the one or more controllers 22 as necessary. Other scenarios are also possible.

The determined blended fuel economy measure, BLMPG, may be communicated to a driver via the display/interface 26.

Additionally/alternatively, the one or more controllers 22 may, for example, determine a distance to empty (expected vehicle range) remaining via the following relations/algorithms:

EXRANGE (Expected Vehicle Range Remaining)= [(GASMPG*Remaining gasoline in fuel tank)+ (ELMPG*Remaining kWhrs in the battery 14 above charge depleting lower threshold)]{in units of miles} where

GASMPG (Gasoline Miles Per Gallon During Drive Cycle)=[Distance Traveled During Drive Cycle/ GC]{in units of miles per gallon} and

ELMPG (Electrical Miles Per Gallon During Drive Cycle)=[Distance Traveled During Drive Cycle/ EQGC]{in units of miles per gallon}.

The one or more controllers 22 may obtain/determine information regarding the remaining gasoline in the fuel tank 13 (fuel level) and remaining kWhrs (energy content) in the battery 14 above the battery's charge depleting lower threshold in any suitable/known fashion (for example, based on information from the vehicle's CAN, etc.)

The remaining kWhrs in the battery 14 above the battery's charge depleting lower threshold (or the available charge depletion energy), in this example, is that amount of energy that may be depleted from the battery 14 while still maintaining a battery state of charge greater than 65%. Battery manufacturers typically provide information regarding the energy content stored by a battery at a given state of charge. This information may be stored in memory, in a look up table for example, and accessed by the one or more controllers 22 as needed. If, for example, the state of charge of the battery 14 is 75% (and assuming the battery's charge depleting lower threshold is 65%), the remaining kWhrs (energy content) in the battery 14 above the battery's charge depleting lower threshold may be determined by taking the difference between the stored energy content of the battery at a 75% state of charge and the stored energy content of the battery at a 65% state of charge. Other techniques, however, may be used.

The expected vehicle range remaining, EXRANGE, (or any other parameter determined or obtained) may be communicated to the driver via the display/interface 26.

The algorithms disclosed herein may be deliverable to a processing device, such as the one or more controllers 22, which may include any existing electronic control unit or dedicated electronic control unit, in many forms including, but not limited to, information permanently stored on non-writable storage media such as ROM devices and information alterably stored on writeable storage media such as floppy disks, magnetic tapes, CDs, RAM devices, and other magnetic and optical media. The algorithms may also be implemented in a software executable object. Alternatively, the algorithms may be embodied in whole or in part using suitable hardware components, such as application specific integrated circuits (ASICs), field-programmable gate arrays (FPGAs), state machines, controllers or other hardware components or devices, or a combination of hardware, software and firmware components.

While embodiments of the invention have been illustrated and described, it is not intended that these embodiments illustrate and describe all possible forms of the invention. The words used in the specification are words of description rather than limitation, and it is understood that various changes may be made without departing from the spirit and scope of the invention.

What is claimed is:

1. A vehicle comprising:
   an engine and electric machine each configured to generate motive power for the vehicle;
   a battery configured to store energy for the electric machine;
   a tank configured to store fuel for the engine; and
   one or more controllers configured to output a vehicle drive range based on output from a first sensor related to an available charge depletion energy in the battery for operating in charge depleting mode and output from a second sensor related to an amount of fuel in the tank.

2. The vehicle of claim 1 wherein the available charge depletion energy in the battery is based on a difference between an energy content of the battery at a current state of charge and an energy content of the battery at a state of charge approximately equal to the battery's charge depleting lower threshold.

3. The vehicle of claim 1 wherein the output is further based on an efficiency associated with converting electrical power to mechanical power and an efficiency associated with converting fuel power to mechanical power.

4. A method for advising a driver of a vehicle including a battery and fuel tank comprising:
   outputting, by at least one controller, a drive range based on output from sensors related to a gasoline consumption rate for a drive cycle of the vehicle, an equivalent gasoline consumption rate for the drive cycle, an amount of fuel in the fuel tank, and an available charge depletion energy in the battery for operating in charge depleting mode.

5. The method of claim 4 wherein the available charge depletion energy in the battery is based on a difference between an energy content of the battery at a current state of charge and an energy content of the battery at state of charge approximately equal to the battery's charge depleting lower threshold.

6. The method of claim 4 wherein the equivalent gasoline consumption rate for the drive cycle is further based on an efficiency associated with converting electrical power to mechanical power.

7. A plug-in hybrid electric vehicle comprising:
   a battery;
   a fuel tank; and
   one or more controllers configured to output an expected drive range of the vehicle based on output from a first sensor related to an available charge depletion energy in the battery for operating in charge depleting mode and output from a second sensor related to an amount of fuel in the fuel tank.

8. The vehicle of claim 7 wherein the available charge depletion energy in the battery is based on a difference between an energy content of the battery at a current state of charge and an energy content of the battery at a state of charge approximately equal to the battery's charge depleting lower threshold.

9. The vehicle of claim 7 wherein the output is further based on an efficiency associated with converting electrical power to mechanical power and an efficiency associated with converting fuel power to mechanical power.

\* \* \* \* \*